United States Patent
Barbulescu

(10) Patent No.: US 6,552,655 B2
(45) Date of Patent: Apr. 22, 2003

(54) SIGNALING ARRANGEMENT FOR VEHICLE, IN PARTICULAR MOTOR VEHICLE, LOCKING CIRCUIT

(75) Inventor: Virgil Barbulescu, Saint Aubin en Bray (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/958,024

(22) PCT Filed: Feb. 1, 2001

(86) PCT No.: PCT/FR01/00310

§ 371 (c)(1),
(2), (4) Date: Oct. 2, 2001

(87) PCT Pub. No.: WO01/56831

PCT Pub. Date: Aug. 9, 2001

(65) Prior Publication Data

US 2002/0171536 A1 Nov. 21, 2002

(30) Foreign Application Priority Data

Feb. 2, 2000 (FR) .............................................. 00 01295

(51) Int. Cl.[7] .............................................. B60R 25/10
(52) U.S. Cl. .............................. 340/426.11; 340/426.13; 340/815.4
(58) Field of Search .......................... 340/815.4, 425.5, 340/426, 428, 10.2, 10.3, 10.4, 10.5, 3.2, 3.7, 426.1, 426.11, 426.12; 70/286, 315, 202, 225; 236/94; 200/5 R; 250/214 B

(56) References Cited

U.S. PATENT DOCUMENTS

| | | | | |
|---|---|---|---|---|
| 4,683,741 A | | 8/1987 | Fields | 70/432 |
| 5,103,085 A | * | 4/1992 | Zimmerman | 250/221 |
| 5,539,388 A | * | 7/1996 | Modgil | 340/3.2 |
| 5,611,226 A | | 3/1997 | Fata | 70/454 |
| 5,677,663 A | * | 10/1997 | Sansome | 340/426 |
| 5,736,696 A | * | 4/1998 | Rosso | 200/5 R |
| 5,931,378 A | * | 8/1999 | Schramm | 236/94 |
| 6,104,281 A | * | 8/2000 | Heinrich et al. | 340/10.5 |

FOREIGN PATENT DOCUMENTS

| | | |
|---|---|---|
| EP | 0 353 343 | 2/1990 |
| JP | 05118171 | 5/1993 |
| JP | 06167147 | 6/1994 |
| JP | 09324565 | 12/1997 |

* cited by examiner

Primary Examiner—Van Trieu
(74) Attorney, Agent, or Firm—Liniak, Berenato & White

(57) ABSTRACT

A signaling arrangement for a vehicle, in particular motor vehicle, comprising a ring made of translucent or transparent material enclosing the body of an element controlling contact in the vehicle and further comprising element for illuminating the ring. The lighting elements illuminate the ring made of translucent or transparent material in accordance with a lighting mode or another depending on whether the vehicle locking circuit is activated or not.

13 Claims, 4 Drawing Sheets

FIG_1

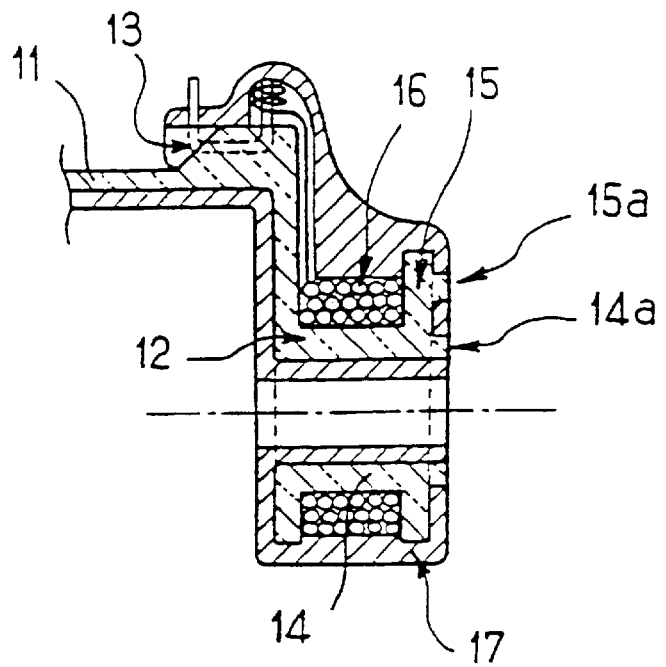
FIG_3a
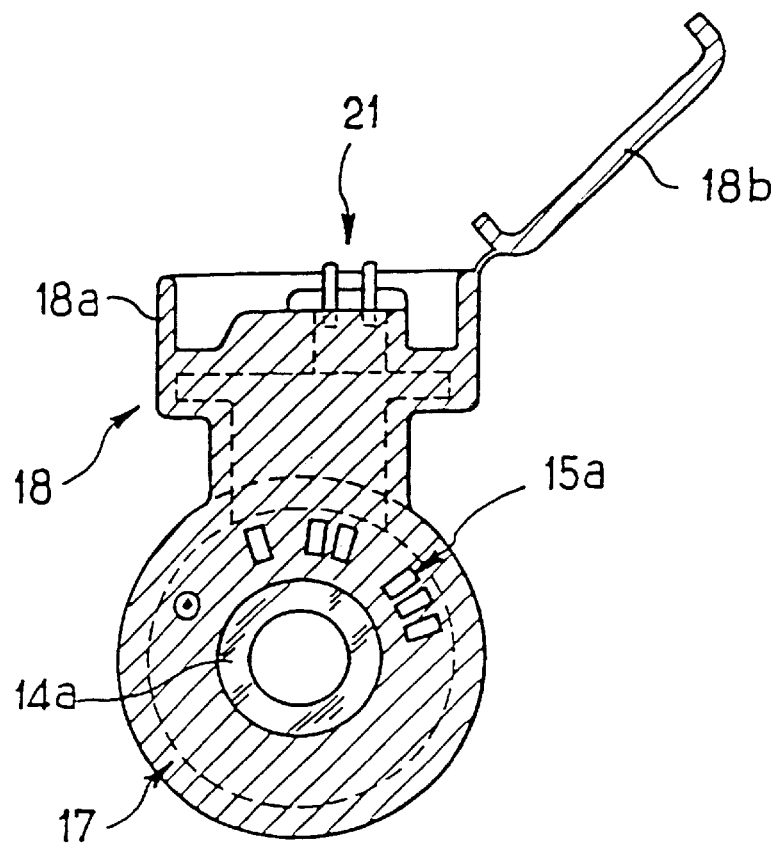
FIG_3b

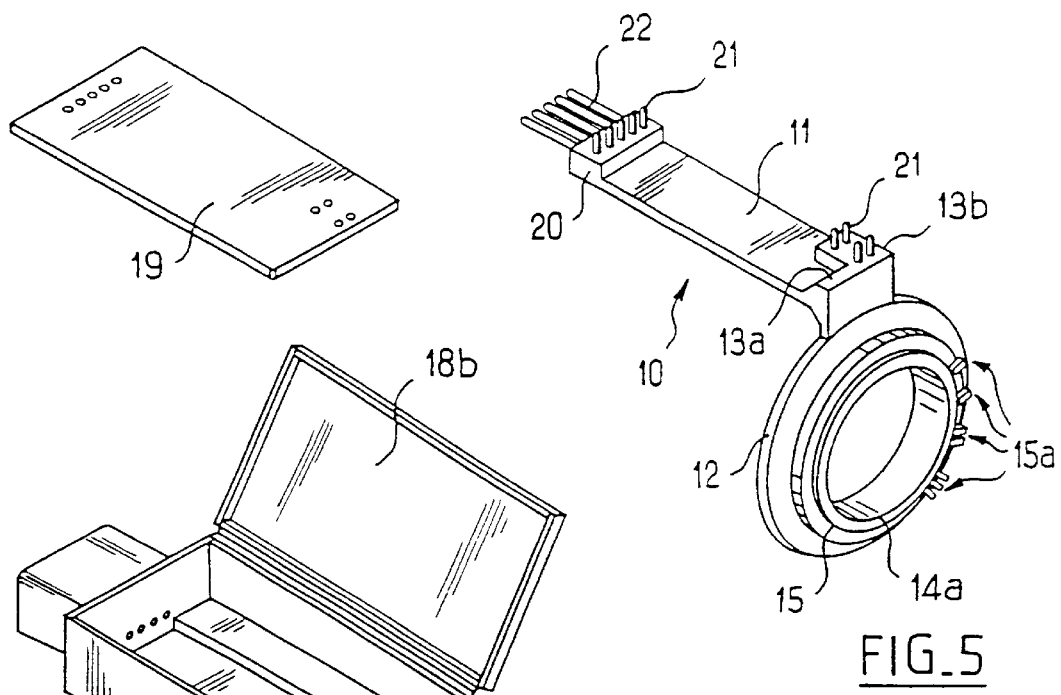
FIG_5
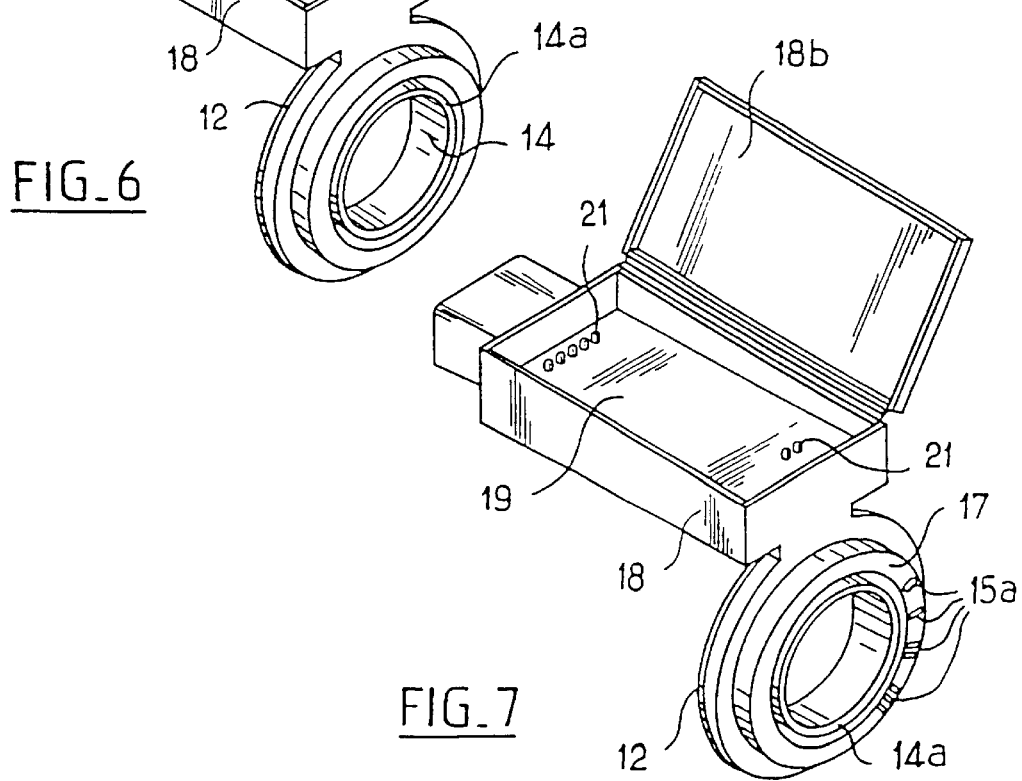
FIG_6
FIG_7

SIGNALING ARRANGEMENT FOR VEHICLE, IN PARTICULAR MOTOR VEHICLE, LOCKING CIRCUIT

BACKGROUND OF THE INVENTION

1. Field of the Invention

The present invention relates to motor vehicle immobilization systems.

2. Description of Related Art

Immobilization systems are conventionally known which comprise a mechanical lock controlled by a key, as well as an immobilization circuit controlled by a remote control device, such as a transponder integrated into the head of the vehicle key or a remote control actuated by pushbutton or a keypad.

Generally, an indicator light is provided on the vehicle dashboard, which light informs the driver as to whether or not his vehicle's immobilization circuit is activated.

However, the driver does not often instinctively check whether this indicator light is or is not activated when he turns his contact key.

SUMMARY OF THE INVENTION

A first aim of the invention is to solve this problem and to propose a solution allowing effective signaling of the activated or nonactivated state of the vehicle's immobilization circuit.

Moreover, arrangements are already known which make it possible to illuminate a piece which surrounds the body of a contact key lock at the level of the zone of insertion of the key.

This piece is generally illuminated when the vehicle's contact switch is closed or else when the vehicle's headlamps are lit.

The driver then sees a luminous ring around the body of the lock.

An exemplary known arrangement for such an illumination system has been represented in FIG. 1.

This arrangement comprises a piece 1 made of a translucent material which terminates at one end in an annular collar la which surrounds the body of the lock at the level of the zone of insertion of the key.

It furthermore comprises a housing 2, of which a first part 2a, made of an opaque (for example black) plastic, is overmolded over this piece 1 so as to leave visible only the rim of the collar 1a, as well as markers or graphical indications 9 which surround the collar la. More precisely, these markers or graphical indications 9 are molded in one piece with the piece 1, constituting a thickening with respect to a flat annular skirt which surrounds the collar la, said annular skirt being for its part hidden by the overmolding constituted by the part 2a of the housing 2.

The illuminating light is guided up to the piece 1 by a piece 3 made of a transparent material, of which a part 3a is nested in the piece 1 and of which another part 3b lies substantially perpendicular to the axis of the body of the lock.

The part 3a, in contact with the body of the piece 1, makes it possible to diffuse the light in the latter.

The part 3b for its part exhibits a recess 4 in which is received an illumination lamp 5 carried by a printed circuit board 6.

This part 3b for its part is overmolded by a second part, referenced 2b, of the housing 2.

An opaque cover 8 is furthermore attached to the entire structure.

A coil 7 which constitutes the antenna for communicating with the transponder can be integrated into the housing 2.

An arrangement of the type as represented in FIG. 1 nevertheless has the drawback of being particularly complex and of requiring numerous assembly operations.

In particular, it requires the fitting of the piece 3 onto the piece 1 and the part 2a of the housing 2.

Another aim of the invention is to propose an arrangement structure which is simpler to assemble.

Thus, the invention proposes a signaling arrangement for vehicle, in particular motor vehicle, comprising a ring made of a translucent or transparent material which surrounds the body of a contact control element in said vehicle and also comprising means for the illumination of said ring, characterized in that said means of illumination illuminate said ring made of a translucent or transparent material according to one mode of illumination or another depending on the activated or nonactivated state of a circuit for immobilizing the vehicle.

With such an arrangement, the driver sees immediately whether or not the immobilization circuit is activated. He knows easily whether or not he has to activate the immobilization unlocking.

Advantageously, in particular, the means of illumination comprise at least two sources emitting at different wavelengths, means controlling the activation of one or other of these two sources depending on the activated or nonactivated state of the circuit for immobilizing the vehicle.

As a variant, in one mode of illumination, the means of illumination illuminate the ring alternately, or continuously or on the contrary do not illuminate it.

Moreover, the arrangement preferably comprises a piece forming a light guide made of a transparent material, which comprises on the one hand a support forming portion which is able to carry at least one source or means and on which said source is mounted and which is of substantially plane shape and on the other hand a substantially annular portion which extends said support forming portion while lying along a plane perpendicular to the plane of the latter portion and which is extended by a portion which defines the illuminated or intended to be illuminated ring, said substantially annular portion guiding the light up to the portion which defines said ring and being, with at least a part of the support forming portion, overmolded by an opaque material.

With such an arrangement, mounting is simplified, since it is sufficient to attach the light source or sources to the assembly constituted by the piece made of a transparent material, the guiding element and their common overmolding in order for the arrangement to be complete.

The assembly operations are diminished.

Advantageously, furthermore:

the piece forming a light guide comprises a prism forming portion which is carried by the support forming part in the immediate vicinity of the light source, said prism forming portion being nonovermolded;

the portion which extends the flat annular portion is a collar of tubular general shape over which the opaque material is overmolded, said collar terminating in a rim at least part of which is not overmolded and defines the illuminated or intended to be illuminated ring;

an antenna forming coil is wound on the collar and is overmolded by the opaque material;

the overmolding defines, at the level of the support forming portion of the piece forming a light guide, a receptacle housing in which is received a printed circuit board which carries one or more sources;

the collar also terminates in markers and/or graphical indications which are distributed around the illuminated or intended to be illuminated ring and that the overmolding surrounds but leaves visible;

a source is a laser or light-emitting diode.

The invention also relates to a piece made of a transparent material forming a light guide, characterized in that, in respect of an arrangement according to one of the preceding claims, it comprises on the one hand a support forming portion which is able to carry at least one source or means and on which said source is mounted and which is of substantially plane shape and on the other hand a substantially annular portion which extends said support forming portion while lying along a plane perpendicular to the plane of the latter portion and which is extended by a portion which defines a ring intended to be illuminated, said substantially annular portion being able to guide the light up to the portion which defines said ring.

BRIEF DESCRIPTION OF THE DRAWINGS

Other characteristics and advantages of the invention will become further apparent from the following description, which is purely illustrative and nonlimiting and must be read in conjunction with the appended drawings in which:

FIGS. 3a and 3b are representations, respectively in an axial sectional view and a front view, of the piece of FIG. 2 overmolded;

FIGS. 5 and 6 are representations similar to those of FIGS. 2 and 3 illustrating another possible embodiment for the invention;

FIG. 7 is a representation of the arrangement of FIG. 6 in which the printed circuit board which carries the light source or sources is positioned inside the housing defined by the overmolding of the arrangement.

DETAILED DESCRIPTION OF PREFERRED EMBODIMENT

Figure 1:
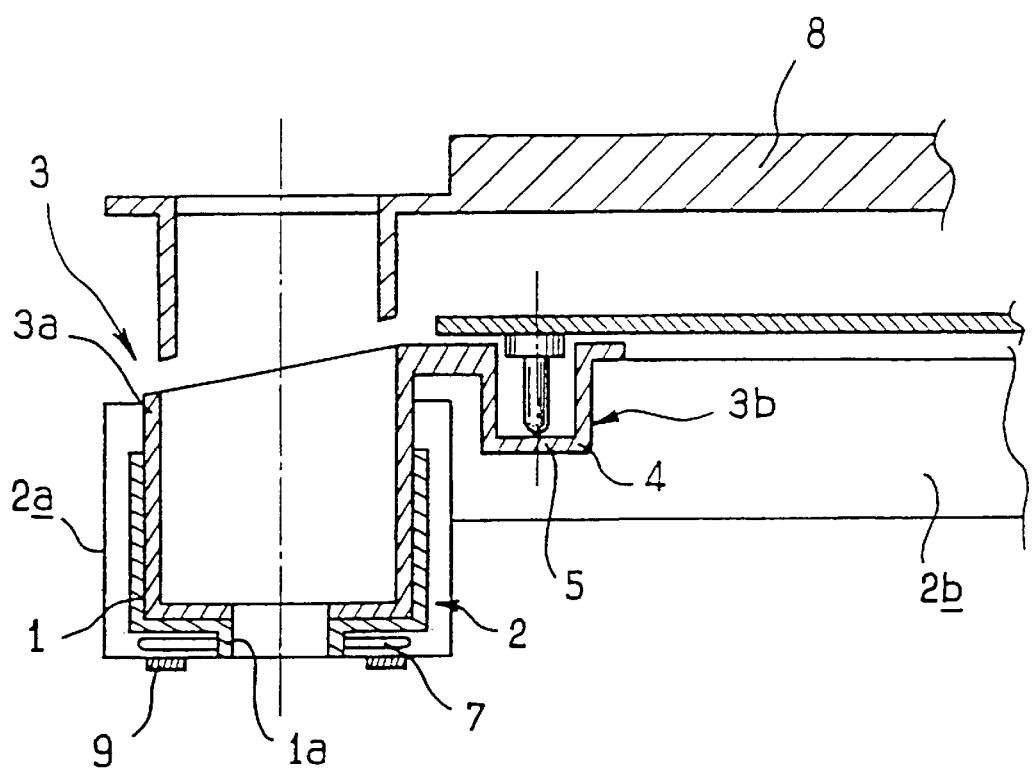
FIG. 1, already discussed, is a sectional schematic representation of an arrangement in accordance with a known state of the art.
Figure 2:
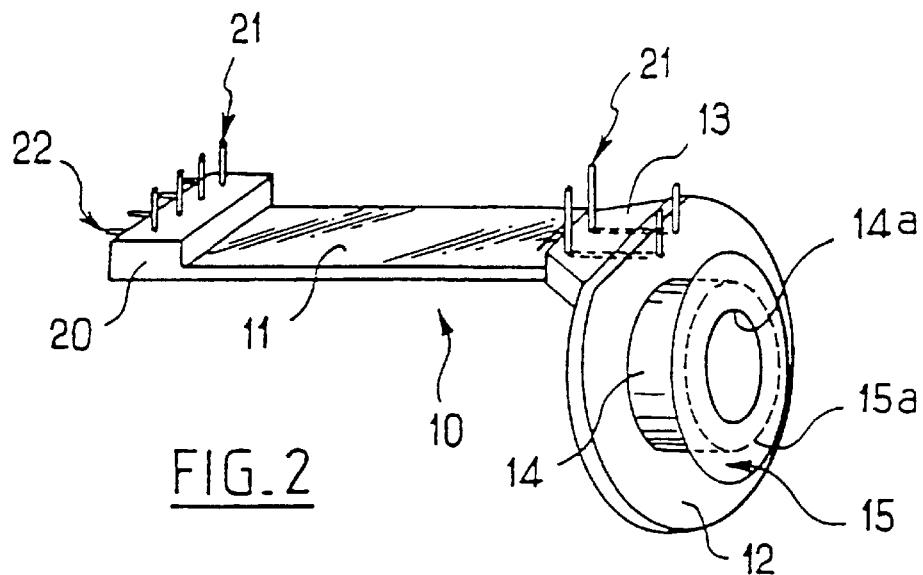
FIG. 2 is a perspective schematic representation of a piece of an arrangement in accordance with an embodiment of the invention.
Figure 4:
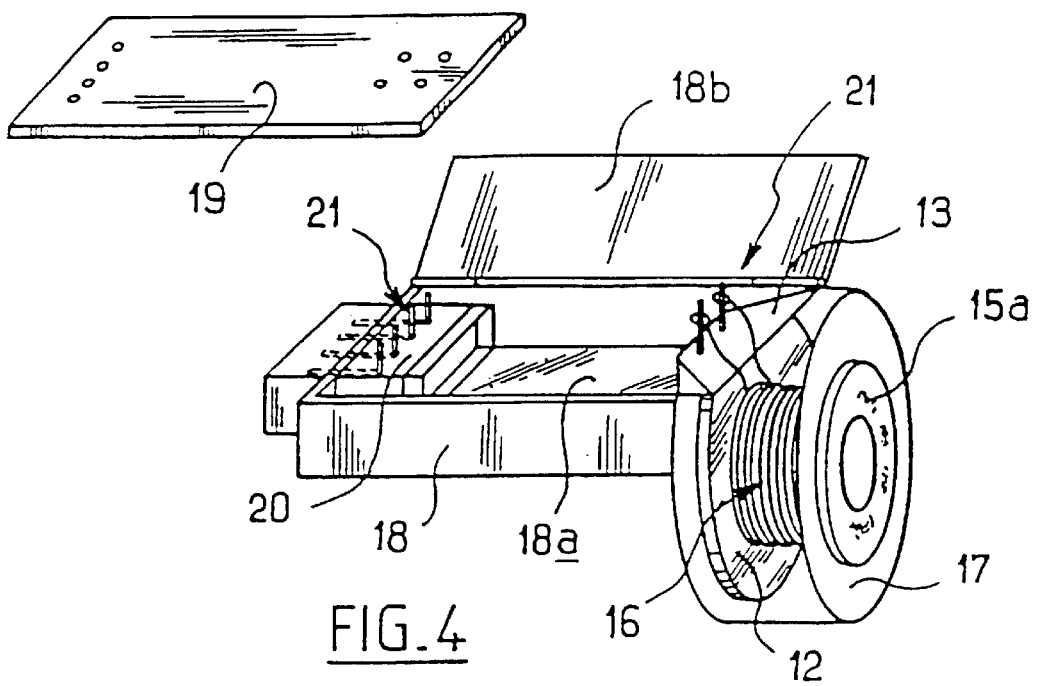
FIG. 4 is a schematic representation of the piece of FIG. 2 and of the ring of FIG. 3 both clad with an overmolding.

The illumination arrangement which is illustrated in FIGS. 2 to 4 comprises a main piece, referenced in general by 10, which is made of a transparent plastic.

This piece 10 comprises:

- a part 11 which constitutes an elongate support of plane parallelepipedal general shape,
- a portion 12 having a general flat ring shape, which lies along a plane perpendicular to the part 11, its axis being parallel to the large sides of the part 11,
- an intermediate prism forming portion 13 which lies between the part 11 and the portion 12 and which is able to guide the light which it receives from a source situated at the level of the part 11 so as to diffuse it in the part 12, this intermediate portion 13 being of trapezoidal shape,
- a tubular collar 14 which lies coaxially from the portion 12, on the side of the latter away from the part 11, this collar 14 having a smaller outer diameter than the outer diameter of the portion 12 and an inner diameter which corresponds to the inner diameter of the latter portion,
- a flat annular skirt 15 which surrounds the collar 14 while being slightly set back with respect to the latter and which is made in one piece with relief elements 15a which define inscriptions and/or markers distributed over a ring around the collar 14.

The rim 14a of the collar 14 constitutes the ring which is intended to appear as illuminated so as to provide the driver with an indication in particular regarding the activated or nonactivated nature of the immobilization circuit.

The relief elements 15a also appear as illuminated with the collar 14.

Moreover, the arrangement also comprises, as the case may be, a coil 16 which is wound on the tubular collar 14 and which constitutes an antenna for sending and receiving radio signals for communicating with a transponder, for example integrated into the head of the vehicle key.

The arrangement furthermore comprises on the piece 10 and the coil 16, an overmolding 17 made of an opaque, for example black, plastic.

This overmolding 17 envelops the portion 12 and the tubular collar 14 so as to leave visible, externally, only a part of the rim 14a of said collar 14 and the relief elements 15a which surround it. (In the whole of the present text, the terms front and rear should be understood with respect to the direction of insertion of the key into the body of the lock, the head of the key being located in front of the body of the lock when said key is inserted into it).

At the level of the support forming part 11 and of the prism forming portion 13, the overmolding 17 defines a receptacle housing 18 of parallelepipedal shape, whose bottom 18a is overmolded over the part 11, the prism 13 itself, however, not being overmolded, at least at the level of its rear part, and being located inside the receptacle housing 18.

This receptacle housing is intended to receive a printed circuit board 19 of complementary shape to that of the interior of the receptacle housing 18.

This board 19 is intended to bear in the receptacle housing 18 on, firstly, the prism forming portion 13 which as will have been understood constitutes a thickening with respect to the support 11 and to the bottom of the housing 18 and on, secondly, a thickening 20 at the rear of the support forming part 11.

Furthermore, this board 19 carries one or more light sources, such as a bulb, a light-emitting diode, a laser diode, etc., intended to be positioned just behind the prism forming portion 13 when the board 19 is fitted in the receptacle housing 18.

The prism forming portion 12 [sic] and the thickening 20 carry pins 21 intended to pass through the board 19 at the level of female connection lugs exhibited by said board.

The pins 21 carried by the prism forming portion 13 are linked electrically to the coil 16 and ensure the connection between said coil and the board 19.

The pins 21 carried by the thickening 20 are linked to output pins 22 which lie at the rear of the piece 10, in the extension of the support forming part 11, outside the receptacle housing 18. These pins 21 allow, with the said pins 22, the connection of the board 19 to external means of supply and/or means of management.

It will moreover be noted that the housing 18 has a cover 18b which is molded in one piece with it and which is articulated by pivoting with respect to the receptacle part of said housing 18 at the level of a hinge defined by a thinning of matter along an edge of said receptacle part.

The arrangement just described is mounted as follows:

The piece 10 is initially manufactured by molding.

Then, the coil 16 is positioned on the collar 14 while soldering the end of the wire of the coil 16 to the pins or studs 21.

In a following operation, the overmolding 17 is fitted.

Then, in a following operation, the printed circuit board 19 is positioned in the receptacle housing 18.

After, as necessary, soldering the connections, the cover of the housing 18 is sealed.

The whole is then mounted on a vehicle. The piece 10 and its overmolding are then fastened onto a body of a contact key lock, while the board 19 is connected by the pins 22 to supply means, as well as to the immobilization circuit or to means of management linked to said circuit.

The board 19 then activates the light source or sources which it carries as a function of the signal which it receives from the immobilization circuit or management means linked to said circuit.

When such a source is activated, the light which it emits is guided by the prism forming portion 13 so as to diffuse in the portion 12, the collar 14 and the markers and/or symbols 15a.

The driver then sees, around the body of the contact key lock, an illuminated ring (the rim of the collar 14) with the symbols and/or markers 15a which surround it, at the wavelength of said source.

For example, provision may be made for the board 19 to m carry two light sources (lamps or LEDs) emitting at different wavelengths (for example red and green), one which informs the driver that the immobilization circuit is locked (rim of the collar 14 illuminated in red), the other which informs him that the immobilization circuit is unlocked (rim of the collar 14 illuminated in green).

Of course, embodiments other than that just described are conceivable.

In particular, as illustrated in FIGS. 5 to 7, the prism function can be separated from the pin support function, the thickening at the front of the piece 10 exhibiting two shapes, one, 13a, substantially trapezoidal, which is intended to constitute the prism guiding the light so that it diffuses in the ring 12, the other, 13b, right-angled parallelepipedal, which lies in reverse toward the rear alongside the part 13a and which carries the pins 21.

Likewise, provision may be made for the means of illumination to illuminate the ring of translucent or transparent material with an intensity modulation of the all or nothing type, which differs depending on whether the vehicle's immobilization circuit is or is not activated.

For example, when the immobilization circuit is activated, the ring is illuminated alternately; when the immobilization circuit is deactivated, the ring is illuminated continuously.

Again as a variant, the annulus 14a may not be illuminated when the immobilization circuit is activated and it may be illuminated otherwise (or vice versa).

In these different variants, it is then possible to make provision for just a single illumination source.

What is claimed is:

1. A signaling arrangement for vehicle, in particular motor vehicle, comprising a ring made of a translucent or transparent material which surrounds the body of a contact control element in said vehicle and also comprising means for the illumination of said ring, characterized in that said means of illumination illuminate said ring made of a translucent or transparent material according to at least one mode of illumination depending on the activated or nonactivated state of a circuit for immobilizing the vehicle.

2. The arrangement as claimed in claim 1, characterized in that the means of illumination comprise at least two sources emitting at different wavelengths, means controlling the activation of one or other of these two sources depending on the activated or nonactivated state of the circuit for immobilizing the vehicle.

3. The arrangement as claimed in claim 1, characterized in that, in one mode of illumination, the means of illumination illuminate the ring alternately, or continuously or on the contrary do not illuminate it.

4. The arrangement as claimed in claim 1, characterized in that it comprises a piece forming a light guide made of a transparent material, which comprises on the one hand a support forming portion which is able to carry at least one source or means and on which said source is mounted and which is of substantially plane shape and on the other hand a linking portion which extends said support forming portion while lying along a plane perpendicular to the plane of the latter portion and which is extended by a portion which defines the illuminated or intended to be illuminated ring, said linking portion guiding the light up to the portion which defines said ring and being, with at least a part of the support forming portion, overmolded by an opaque material.

5. The arrangement as claimed in claim 4, characterized in that the piece forming a light guide comprises a prism forming portion which is carried by the support forming part in the immediate vicinity of the light source, said prism forming portion being nonovermolded.

6. The arrangement as claimed in claim 4, characterized in that portion which extends the linking portion is a collar of tubular general shape over which the opaque material is overmolded, said collar terminating in a rim at least part of which is not overmolded and defines the illuminated or intended to be illuminated ring.

7. The arrangement as claimed in claim 6, characterized in that an antenna forming coil is wound on the collar and is overmolded by the opaque material.

8. The arrangement as claimed in claim 6, characterized in that the collar also terminates in markers and/or graphical indications which are distributed around the illuminated or intended to be illuminated ring and that the overmolding surrounds but leaves visible.

9. The arrangement as claimed in claim 4, characterized in that the overmolding defines, at the level of the support forming portion of the piece forming a light guide, a receptacle housing in which is received a printed circuit board which carries one or more sources.

10. The arrangement as claimed in claim 1, characterized in that a source is a laser or light-emitting diode.

11. A piece made of a transparent material forming a light guide, characterized in that, in respect of an arrangement according to claim 1, it comprises on the one hand a support forming portion which is able to carry at least one source or means and on which said source is mounted and which is of substantially plane shape and on the other hand a linking portion which extends said support forming portion while lying along a plane perpendicular to the plane of the latter portion and which is extended by a portion which defines a ring intended to be illuminated, said linking portion being able to guide the light up to the portion which defines said ring.

12. The piece as claimed in claim 11, characterized in that it comprises a prism forming portion which is carried by the support forming portion in the immediate vicinity of a zone intended to receive a light source.

13. The piece as claimed in claim 12, characterized in that the portion which extends the linking portion is a collar of tubular general shape.

* * * * *